Figures 1, 2:
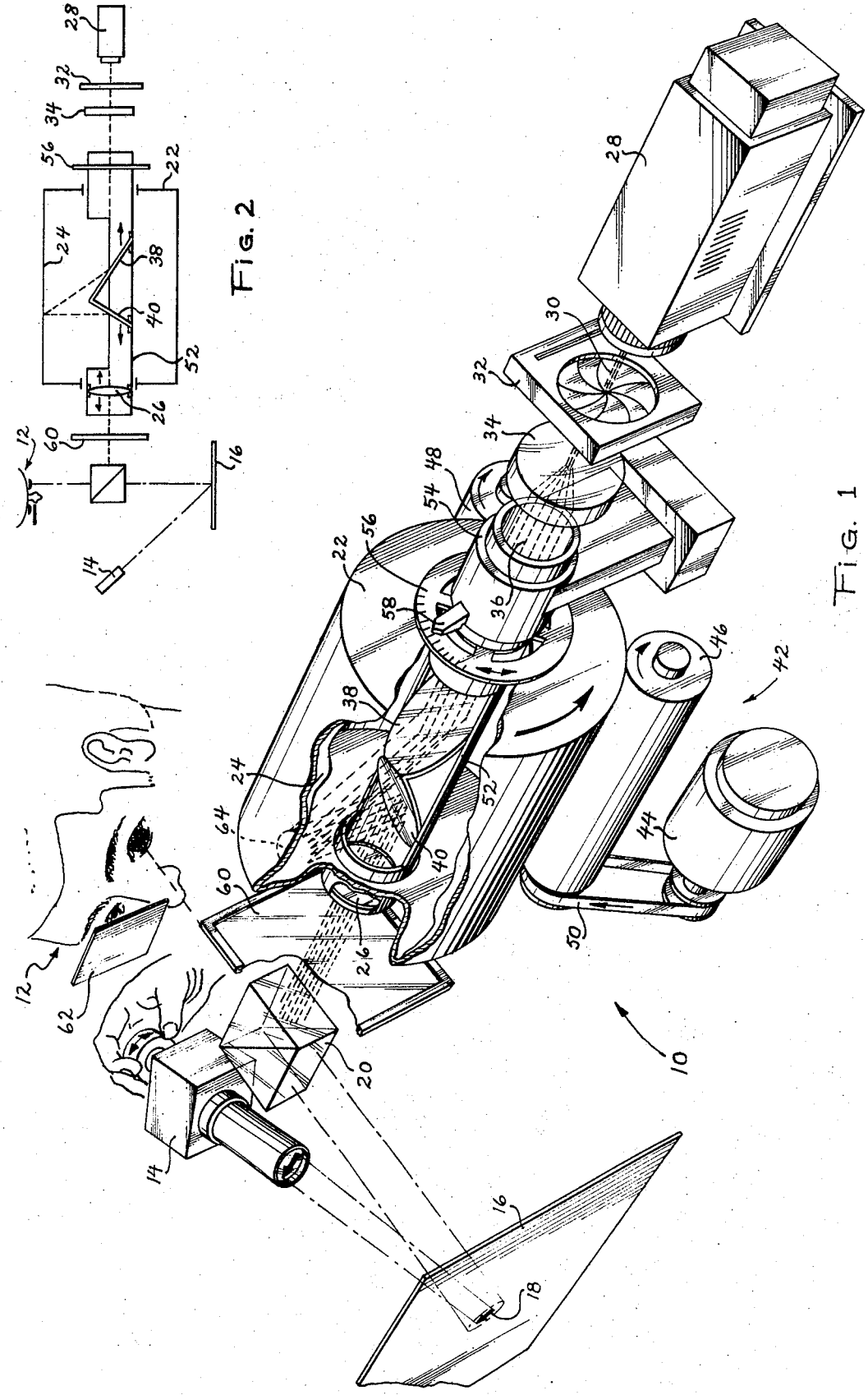

es Patent [19]
Wittenberg

[11] 3,792,918
[45] Feb. 19, 1974

[54] LASER REFRACTOR
[75] Inventor: Sidney Wittenberg, Sudbury, Mass.
[73] Assignee: The Massachusetts College of Optometry, Boston, Mass.
[22] Filed: Nov. 7, 1972
[21] Appl. No.: 304,472

[52] U.S. Cl.......................... 351/36, 351/27, 351/28
[51] Int. Cl............................................. A61b 3/02
[58] Field of Search............. 351/36, 27, 28, 30, 17

[56] References Cited
UNITED STATES PATENTS
3,572,912   3/1971   Knoll .................................... 351/36

OTHER PUBLICATIONS
Proceedings of the IRE, Rigden et al. "The Granularity of Scattered Optical Maser Light," Vol. 50, Nov. 1962, pp. 2367–2368.
Proceedings of the IEEE, B. M. Oliver, "Sparkling Spots & Random Diffraction," Vol. 51, Jan. 1963, pp. 220 & 221.

Primary Examiner—James W. Lawrence
Assistant Examiner—B. C. Anderson
Attorney, Agent, or Firm—Chittick, Thompson & Pfund

[57] ABSTRACT
A laser refractor which utilizes the diffuse reflection of laser light from the interior surface of a slowly rotating drum in order to produce an interference pattern whose apparent motion is a function of the refractive state of the eye.

13 Claims, 2 Drawing Figures

PATENTED FEB 19 1974 3,792,918

LASER REFRACTOR

BACKGROUND OF THE INVENTION

The present invention relates to ophthalmic instruments in general and, more particularly, to a laser refractor.

Laser refraction has been used experimentally to subjectively determine refractive status of adults and children. The determination of the refractive state depends upon the detection of motion of a spatial interference pattern.

The pattern's motion results from that of a slowly rotating drum. The interference pattern moves in opposite directions on opposite sides of the drum and is virtually stationary at the drum. The precision of measurement is ultimately limited by the ability of the subject to observe the granularity of the spatial interference pattern and to discern its motion, since the pattern becomes smaller and moves more slowly upon approaching conjugacy. The motion of the drum is magnified as a function of the distance of the interference pattern from the drum so that the motion slows monotonically until at conjugacy it moves with the velocity of the drum.

The sensitivity of the system is directly related to the rate of rotation of the drum. By speeding up the drum, the sensitivity around neutrality can be greatly increased.

The relative motion of the spatial interference pattern is not only a function of the rate of drum rotation, but also of the radius of the drum as well. Decreasing the radius increases the apparent speed of the pattern while at the same time decreasing the size of the elements in the granular interference pattern.

The apparatus currently in general use for laser refraction comprises a cylindrical drum having a diffuse reflecting surface which revolves slowly about its axis. The drum can also be rotated by means of a gimbal mount about an axis that is perpendicular to the axis revolution. The drum is illuminated by a helium neon laser through a beam expander which increases the area of the drum which can be illuminated by the otherwise very narrow laser beam.

Most commonly, the axis of astigmatism is established first by means of an astigmatic fan dial. The laser drum is rotated about its gimbal mount until the rotation of the drum is aligned with the axis indicated by the astigmatic fan chart. With a meridian established, the subject is asked to report the apparent direction of motion of the speckled pattern. Spherical lenses are changed to slow and eventually stop the motion. The gimbal mount is rotated through 90° and the measurement repeated, usually with spherical lenses. A representative example of such a laser refractor is disclosed in U.S. Pat. No. 3,572,912 issued Mar. 30, 1971 to Henry A. Knoll for METHOD OF AND APPARATUS FOR TESTING AMETROPIA BY LASER REFRACTION.

A number of limitations are inherent in the instrumentation of the gimbal mounted drum laser refractor and in the measurement techniques required by such instrumentation. First, there is a potential hazard for accidental direct exposure since the laser beam is projected across an open room. Secondly, the visual task for the patient is meaningless. The speckled pattern is a constantly changing one and it forms the focus of attention for the task while itself being undefined since the eye will see perfectly focused patterns regardless of the state of accommodation or refraction. Furthermore, the pattern increases in size with an increase in defocus of the reflecting plane. As a result, the patient may very well exert some accommodation. Finally, chromatic aberration which may induce practical differences between the laser determination of refraction and the routine clinical determination of refraction have not been dealt with.

The eye also can accommodate even in the presence of excess minus lenses to produce "against" motion. This is particularly meaningful in light of the fact that the patient may very well exert some accommodation.

Finally, there is some experimental data that the determination of the cylinder axis seems to be the limiting constraint in laser refraction although no reports of the limits of precision or comparisons with subjective refraction have been published to date.

Given, among others, the preceding limitations of existing laser refractors, the parameters of a desirable laser refractor can be defined. These parameters are as follows: (1) the laser light source should be contained in or directly attachable to the chamber of the rotating drum; (2) accommodation should be controlled by providing a definite fixation for the subject which is independent of the laser pattern; (3) calibration to compensate for chromatic aberration is desirable; (4) minimization of the effect of the laser pattern on the character of the measurement (the pattern should not affect accommodation); and, (5) the astigmatic axis and manner of astigmatism should be established by means of the characteristics of the speckled pattern itself. Preferably, the laser refractor should be able to measure an eye monocularly under binocular viewing and have the ability to measure characteristics of accommodation.

It is, accordingly, a general object of the present invention to provide an improved laser refractor which fulfills the parameters set forth above.

It is a specific object of the present invention to provide a laser refractor which accomplishes the general object of the invention by utilizing readily available, optical, electro-optical and mechanical components.

It is a feature of the present invention that the various optical, electro-optical and mechanical components of the laser refractor can be assembled in a compact and self-contained instrumentation package.

These objects and features and other objects of the present invention will best be understood from a detailed description of a preferred embodiment thereof, selected for purposes of illustration and shown in the accompanying drawings, in which:

FIG. 1 is a perspective view of the laser refractor of the present invention showing portions thereof broken away for purposes of clarity; and, FIG. 2 is a diagrammatic view showing the optical path of the laser refractor of the present invention.

Turning now to the drawings, there is shown an improved laser refractor constructed in accordance with the present invention and indicated generally by the reference numeral 10. The desired fixation and accommodative control for a patient or subject 12 are provided by a target slide (not shown) which is projected by projector 14 onto a screen 16. The screen is located at a practical testing distance, e.g. 20 feet, from the projector and subject.

The fixation target shown by an arrow 18 on the screen is viewed by the subject through a beam splitter, dichroic mirror or pellicle mirror 20. The beam splitter 20 superimposes a view of the interior of a slowly rotating, laser refractor drum 22 on the screen. The hollow refractor drum 22 has a diffuse, light reflecting inner surface 24 which may be either an integral part of the drum or formed as a separate coating or removable sheet. An axially adjustable, positive calibration lens 26 images the internal reflecting surface of the drum at any desired position in space. Normally, the surface is imaged near infinity. A variety of drum geometrics can be employed in practicing the invention. For example, the drum can be cylindrical, toroidal, or spherical. In the preferred embodiments, a right circular cylindrical configuration is used for the refractor drum 22.

The internal surface of the drum is illuminated by a monochromatic, coherent light generated by a light source, such as laser 28. The laser 28 generates a very narrow beam 30 of coherent light which passes through an optical shutter system 32 and is expanded by means of a beam expander 34. The beam expander is used only if the cross-sectional area of the light beam illuminates an area on the drum surface which is insufficient to fill the field of view of the observer.

The expanded laser light 36 enters the laser refractor drum 22 along the axis thereof and is reflected by a mirror 38 onto the interior reflecting surface 24 of the drum. The expanded laser light reflected back from the interior surface of drum 22 forms the spatial interference pattern which, after reflection from a second mirror 40 which directs the light out of the drum 22 through the previously mentioned calibration lens 26 and to the beam splitter 20, is viewed by the subject being measured.

The laser refractor drum 22 is slowly rotated by means of a drive system indicated generally by the reference numeral 42. The drive system 42 comprises a motor 44 and two support rolls 46 and 48. Motive power from motor 44 is transmitted to support roll 46 through a power transmission belt 50. The source of electrical power for motor 44 and the control circuitry associated therewith have been omitted from the drawings for purposes of clarity and need not be discussed in any detail because they are well known to those skilled in the art.

The calibration lens 26 and the mirrors 38 and 40 are mounted within an axially rotatable housing 52 which is supported by a bearing mount 54. Rotation of the mirror housing 52 is used to change the virtual (optically reduced) meridian of motion of the rotating drum 22. A suitable scale 56 is secured to and rotates with the housing 52. The scale 56 is indexed by means of a fixed index 58 to indicate the meridian of apparent drum rotation.

With the drum rotating slowly in the direction shown by the arrow in FIG. 1, the subject views the interior reflecting surface of the drum through lens 26. Both of the subject's eyes are left open but only one eye views the spatial interference pattern and refers it to the screen 16. The eye not being measured is fogged slightly. Filters 60 and 62, which may be fixed or adjustable, are used to more nearly equalize the intensity of the images in the two eyes and to control the relative apparent brightness of the observed interference pattern. A slight fogging lens (not shown) may be placed between the beam splitter and the screen thus effecting the clarity of vision without effecting the measurement. Although the pattern may be viewed continuously during the early stages of measurement, the shutter 32 is normally used in the final determination to insure minimum effect of the pattern in the measurement.

The axis of astigmatism is determined by having the subject point the target 18 in the direction of motion of the pattern. If the alignment of the target and the setting of scale 56 with respect to the fixed index 58 do not agree, the housing 52 is rotated appropriately and the setting repeated. It will be appreciated that this technique is similar to that for determining cylinder axis retinoscopically and converges quickly on the correct axis within three or four trials. The amount of astigmatism is measured by using cylindrical lenses to stop the motion of the interference pattern.

For the measurement of refractive error the pattern can also be stopped by moving the mirrors 38 and 40 axially within the housing 52. This movement is indicated in FIG. 2 by the two-way arrow through mirrors 38 and 40. By moving these two mirrors as a unit, the light spot 64 is moved along the inner reflecting surface 25 parallel to the axis of the drum with no apparent movement created in the visual field in a plane normal to the axis. This movement changes the distance between the spot 64 and the axis lens 26 and effectively changes the power of the system. Thus, by calibrating the axial movement of two lenses as a unit, it is possible without supplementary lenses to determine the power to correct the eye. The same technique also can be employed by moving the positive calibration lens 26 along the drum axis as shown by the arrows in the diagrammatic view of FIG. 2.

From the preceding description it can be appreciated that the laser refractor of the present invention provides for the measurement of the axis and amount of astigmatism through the use of an internally illuminated slowly revolving drum and that the measurement can be made with respect to any plane since an external fixation target can be used. Furthermore, the motion of the drum can be referred to any meridian of the eye, measurements can be made under either monocular or binocular fixation and accommodation as well as refractive state can be measured.

Having described in detail a preferred embodiment of my invention, it will be appreciated that numerous variations can be made therein without departing from the scope of the invention as defined in the appended claims. For example, the functions of the beam expander 34 and first light directing mirror 38 can be combined in a single element in the form of a spherical mirror having a relatively short radius. The spherical mirror is positioned slightly off axis in the general location of the mirror 38. The use of a spherical mirror, both as a beam expander and a light director, eliminates the need for a separate beam expander 34 and a first light directing mirror 38, thereby producing a more compact system.

Additionally, two different wavelengths of monochromatic coherent light can be used to bracket both sides of the peak spectrum. In this situation, two different wavelength lasers are employed with suitable means, such as a beam splitter for directing both beams of laser light into the drum 22 along the axis thereof.

What I claim and desire to secure by letters Patent of the United States is:

1. A refractor comprising:
 1 drum means having a diffuse inner light reflecting surface;
 2 means for rotating said drum means about its axis;
 3 means for generating at least one beam of monochromatic coherent light;
 4 means for directing the light beam to the diffuse light reflecting inner surface of said drum means;
 5 means for moving said light beam along the diffuse light reflecting inner surface of the drum means in a plane which is normal to the axis of the drum means; and,
 6 optical means for observing the illuminated portion of the diffuse inner light reflecting surface of the drum.

2. The apparatus of claim 1 wherein said means for generating a beam of monochromatic light comprises a laser.

3. The apparatus of claim 1 wherein said means for directing the light beam to the diffuse light reflecting inner surface of the drum comprises a spherical mirror positioned within and off the axis of said drum.

4. The apparatus of claim 1 wherein said means for directing the light beam to the diffuse light reflecting inner surface of the drum comprises a planar mirror positioned within the drum means along the axis thereof.

5. The apparatus of claim 4 further comprising means for expanding the light beam with the expanded light beam being directed along the axis of the drum to impinge upon said planar mirror.

6. The apparatus of claim 1 further comprising index means for indicating the meridian of virtual drum rotation.

7. The apparatus of claim 1 further characterized by means for controlling the amount of light which is directed into the subject's eye.

8. The apparatus of claim 1 further comprising shutter means for controlling the duration of the light which is directed into the subject's eye.

9. A refractor comprising:
 1 drum means having a diffuse inner light reflecting surface;
 2 means for rotating said drum means about its axis;
 3 means for generating at east one beam of monochromatic coherent light;
 4 means for directing the light beam to the diffuse light reflecting inner surface of said drum;
 5 reflected light directing means positioned within said drum means along the axis thereof for intercepting the light reflected from the diffuse reflecting inner surface of the drum means, said light directing means directing the reflected light out of said drum means along the axis thereof; and,
 6 means for rotating together said light beam directing means and said reflected light directing means about the axis of said drum means.

10. The apparatus of claim 9 further comprising axially adjustable, positive lens means positioned along the axis of the drum to intercept the reflected light which is directed out of said drum means along the axis thereof.

11. The apparatus of claim 10 further comprising means for axially moving together said light beam directing means and said reflected light directing means along the axis of said drum means.

12. A laser refractor comprising:
 1 cylindrical drum means having a diffuse light reflecting inner surface;
 2 means for rotating said cylindrical drum means about its axis;
 3 laser means for generating a beam of coherent light;
 4 means for expanding said coherent light beam with the expanded beam of coherent light being directed into said cylindrical drum means along the axis thereof;
 5 first light directing means positioned within said cylindrical drum means along the axis thereof for directing the expanded coherent light beam to the diffuse light reflecting inner surface of said cylindrical drum;
 6 second light directing means positioned within said cylindrical drum means along the axis thereof for intercepting the light reflected from the diffuse reflecting inner surface of the cylindrical drum means, said second light directing means directing the reflected light out of said cylindrical drum means along the axis thereof;
 7 means for rotating together said first and second light directing means about the axis of said cylindrical drum means; and,
 8 means positioned outside of said cylindrical drum means for directing said reflected light into a subject's eye.

13. The apparatus of claim 12 wherein said first light directing means comprises a planar mirror positioned at an obtuse angle with respect to the axis of said cylindrical drum means and wherein said second light directing means comprises a planar mirror positioned at an angle of 45° with respect to said axis so that a plane defined by the normals of the two mirrors also contains said drum axis.

* * * * *